United States Patent
Chen et al.

(10) Patent No.: US 9,102,826 B2
(45) Date of Patent: *Aug. 11, 2015

(54) CURABLE COMPOSITIONS

(75) Inventors: Hongyu Chen, Zhangjiang (CN); Annie Gui Hong Liao, Beijing (CN)

(73) Assignee: Blue Cube IP LLC, Midland, MI (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/125,839

(22) PCT Filed: Jun. 30, 2011

(86) PCT No.: PCT/CN2011/076687
§ 371 (c)(1),
(2), (4) Date: Dec. 12, 2013

(87) PCT Pub. No.: WO2013/000158
PCT Pub. Date: Jan. 3, 2013

(65) Prior Publication Data
US 2014/0128509 A1    May 8, 2014

(51) Int. Cl.
| | |
|---|---|
| C08L 63/00 | (2006.01) |
| C08L 35/00 | (2006.01) |
| C08L 35/06 | (2006.01) |
| C08L 25/14 | (2006.01) |
| C08G 59/40 | (2006.01) |
| C08K 5/5353 | (2006.01) |
| C08K 5/5357 | (2006.01) |
| C08K 5/5313 | (2006.01) |

(52) U.S. Cl.
CPC ............. C08L 35/06 (2013.01); C08G 59/4071 (2013.01); C08L 63/00 (2013.01); C08K 5/5313 (2013.01)

(58) Field of Classification Search
CPC ..... C08G 8/36; C08G 59/4071; C08K 5/5397
See application file for complete search history.

(56) References Cited

U.S. PATENT DOCUMENTS

| | | | |
|---|---|---|---|
| 8,691,932 B2* | 4/2014 | Mullins et al. | 528/167 |
| 2007/0221890 A1* | 9/2007 | Gan | 252/601 |
| 2009/0170983 A1 | 7/2009 | Tada et al. | |
| 2010/0130698 A1 | 5/2010 | Su | |
| 2011/0053447 A1* | 3/2011 | Su et al. | 442/147 |
| 2013/0041116 A1* | 2/2013 | Mullins et al. | 525/523 |

FOREIGN PATENT DOCUMENTS

| | | |
|---|---|---|
| CN | 101602881 | 12/2009 |
| JP | 2002114832 | 4/2002 |

OTHER PUBLICATIONS

DIC Corporation, Epiclon Standard Products Epoxy Resins and Curing Agents (2013).*
International Search Report and Written Opinion from related PCT Application PCT/CN2011/076687, filed Jun. 30, 2011, 13 pgs.

* cited by examiner

*Primary Examiner* — Mark Kaucher
*Assistant Examiner* — Kregg Brooks
(74) *Attorney, Agent, or Firm* — Brooks, Cameron & Huebsch, PLLC

(57) ABSTRACT

Embodiments include a curable composition comprising an epoxy resin, a non-halogen flame retardant agent comprising at least two of an aryl-cyanato group and at least two of a phosphorus group, and a styrene and maleic anhydride copolymer. Embodiments include method of preparing the curable composition, prepregs that include a reinforcement component and the curable composition, and an electrical laminate formed with the curable composition.

17 Claims, 5 Drawing Sheets

CURABLE COMPOSITIONS

This application is a National Stage Application under 35 U.S.C. §371 of PCT/CN2011/076687, filed Jun. 30, 2011 and published as WO 2013/000158 on Jan. 3, 2013, the entire contents of which are incorporated herein by reference in its entirety.

FIELD OF DISCLOSURE

Embodiments of the present disclosure relate to curable compositions and in particular to curable compositions that include a non-halogen flame retardant agent and a method of producing the curable compositions.

BACKGROUND

Curable compositions are compositions that include thermosettable monomers that can be crosslinked. Crosslinking, also referred to as curing, converts the curable compositions into crosslinked polymers (i.e., a cured product) useful in various fields such as composites, electrical laminates, and coatings because of, among other things, their chemical resistance, mechanical strength, and electrical properties. For example, curable compositions can be used in electronics as protective films, adhesive materials, and/or insulating materials, such as interlayer insulating films.

To be useful for these applications, a cured product of the curable compositions need to provide ease of handling and certain necessary physical, thermal, electrical insulation, and moisture resistance properties. For example, curable compositions having a low dielectric constant, a high solubility, and a low moisture uptake, as well as a high glass transition temperature ($T_g$), can be desirable combination of properties for electrical applications.

The use of curable compositions in electronic applications can also influence the electrical signals generated in the electronics. Increases in electrical signal frequency in an electronic system (e.g., a computer system) allows for data to be processed at a higher rate. Curable compositions in the vicinity of such electrical signals, however, can exert a large influence on transmission loss of such electrical signals in a high frequency circuit. To minimize this influence, curable compositions having a low dielectric constant and a low dissipation factor, in addition to the other properties discussed herein, are desired.

Curable compositions, however, can be flammable. As such, different approaches have been made to impart flame resistance to the cured products of the curable compositions. Two main approaches have been taken to providing flame resistance. The first is a "Green" approach in which halogen-free compounds are used. The second approach makes use of halogen compounds. Halogenated compounds have been used for decades in the electronic industry to impart flame resistance to electrical and electronic assemblies. For example, tetrabromobisphenol-A (TBBA) has been a workhorse flame resistance in electrical laminates for many years. Halogenated compounds, however, are now being scrutinized by environmental groups due to the possibility of dioxin formation during the incineration of electronic components at their end of life. In many developed countries the burning of the components is regulated and controlled, however, in developing countries, burning is often unregulated, increasing the likelihood of brominated dioxin release into the atmosphere.

SUMMARY

Embodiments of the present disclosure provide curable compositions including an epoxy resin, a non-halogen flame retardant agent comprising at least two of an aryl-cyanato group and at least two of a phosphorus group, and a styrene and maleic anhydride copolymer. For the various embodiments, the non-halogen flame retardant agent can be represented by a compound of Formula (I):

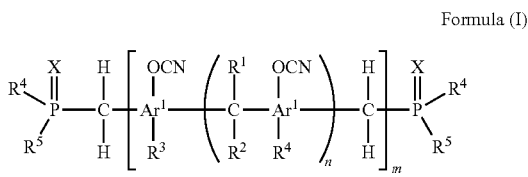

Formula (I)

wherein m is an integer from 1 to 20; wherein n is an integer from 0 to 20 with the proviso that when n is 0 then m is an integer from 2 to 20; wherein X is selected from the group consisting of sulfur, oxygen, a lone electron pair, and combinations thereof;

wherein each $R^1$ and $R^2$ is independently a hydrogen, an aliphatic moiety having 1 to 20 carbon atoms, an aromatic hydrocarbon moiety having 6 to 20 carbon atoms, where the aliphatic moiety and the aromatic hydrocarbon moiety can be joined to form a cyclic structure; wherein $R^3$ is selected from the group consisting of a hydrogen, an aliphatic moiety having 1 to 20 carbon atoms, an aromatic hydrocarbon moiety having 6 to 20 carbon atoms, $R^4R^5P(=X)CH_2—$, and $ROCH_2—$, where R is an aliphatic moiety having 1 to 20 carbon atoms; wherein each $R^4$ and $R^5$ is independently an aliphatic moiety having 1 to 20 carbon atoms, an aromatic hydrocarbon moiety having 6 to 20 carbon atoms, where the aliphatic moiety and the aromatic hydrocarbon moiety can be joined to form a cyclic structure, RX—, or wherein $R^4$ and $R^5$ together are $Ar^2X—$; and wherein each $Ar^1$ and $Ar^2$ is independently a benzene, a naphthalene, of a biphenyl.

For the various embodiments, a method of preparing the curable composition can include providing an epoxy resin and reacting the epoxy resin with a non-halogen flame retardant agent and a copolymer of styrene with maleic anhydride, wherein the non-halogen flame retardant agent comprises at least two of an aryl-cyanato group and at least two of a phosphorus group.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
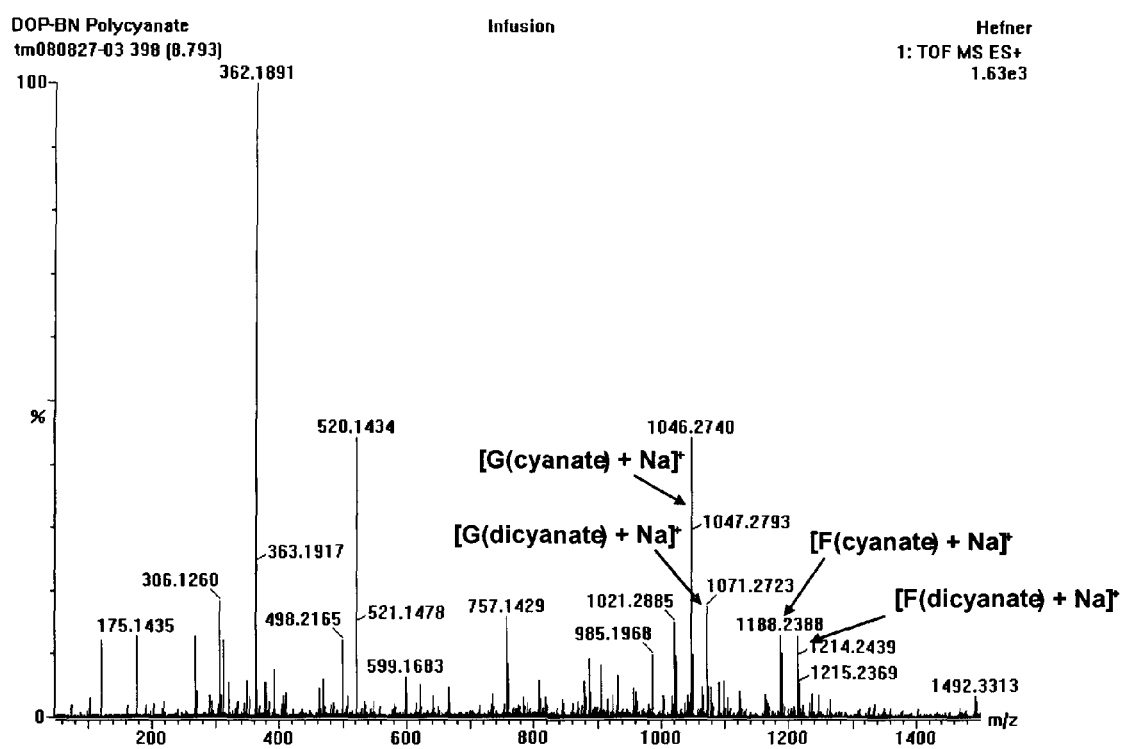
FIG. 1 provides a positive electrospray ionization mass spectrum from a DOP-BN polycyanate (CE-DOP-BN) sample of the present disclosure.

Embodiments of the present disclosure include a curable composition that includes an epoxy resin, a non-halogen flame retardant agent comprising at least two of an aryl-cyanato group and at least two of a phosphorus group, and a styrene and maleic anhydride copolymer. For the various embodiments, the non-halogen flame retardant agent can be a cyanate derivative of a phosphorus-substituted polyphenol formed by condensing an active phosphorous compound (H—P($=$X)R$^4$R$^5$) with and an etherified resole. In the particular case where the etherified resole is from bisphenol A and the active phosphorus compound is H-DOP (9,10-dihydro-9-oxa-10-phosphaphenanthrene-10-oxide) the phosphorus substituted polyphenol will be called DOP-BN and the polycyanate (i.e., the non-halogen flame retardant agent) will be referred to interchangeably as the "DOP-BN polycyanate" and "CE-DOP-BN". The non-halogen flame retardant agent of the present disclosure is then obtainable from the reaction of the DOP-BN and a compound such as a cyanogen halide (e.g., cyanogen bromide) that reacts with a hydroxy group on the DOP-BN to yield a cyanato group forming the non-halogen flame retardant agent (CE-DOP-BN).

For the various embodiments, the non-halogen flame retardant agent of the present disclosure can be used as, among other things, a self-curing compound, a hardener and/or as a component in a hardener composition for a curable composition. The non-halogen flame retardant agent of the present disclosure can also be used as a reactive starting material for reacting with other polymers. For example, the aryl-cyanato group of the non-halogen flame retardant agent may be reacted with epoxy resins. In this embodiment, the non-halogen flame retardant agent acts as a crosslinking agent, curing agent, and/or a hardener for the epoxy resin.

The non-halogen flame retardant agent of the curable compositions of the present disclosure also provides the advantage of being halogen free while acting as a flame retardant for cured products of the curable composition. Such cured products that include the curable compositions can also have suitable thermal and electrical properties useful as protective films, adhesive materials, and/or insulating materials in a variety of electronic applications.

Additionally, the curable compositions of the present disclosure include a styrene and maleic anhydride copolymer. The styrene and maleic anhydride copolymers can provide a combination of acceptable properties in curable compositions such as epoxy systems that may include a low dielectric constant and/or a high glass transition temperature.

For the various embodiments, the curable compositions include the non-halogen flame retardant agent, the styrene and maleic anhydride copolymer, and the epoxy resin. For the various embodiments, a molar ratio of an epoxy group of the epoxy resin to a maleic anhydride group of the styrene and maleic anhydride copolymer can be within a range of 1.0:1.0 to 2.6:1.0. Additionally, the phosphorus content of the curable composition can be within a range of from 0.1 weight percent (wt. %) to 3.5 wt. %, based on a total weight of the curable composition. For the various embodiments, the molar ratio of the epoxy group to the maleic anhydride group and the phosphorus content of the curable composition provide improvements in thermomechanical properties and electrical properties, as compared to the cured products of curable compositions not having CE-DOP-BN and the styrene and maleic anhydride copolymer. For example, thermomechanical properties and electrical properties can include, but are not limited to, glass transition temperatures, dielectric constants, and dissipation factors of cured products of the curable compositions having the non-halogen flame retardant agent, the styrene and maleic anhydride copolymer, and the epoxy resin. The curable compositions of the present disclosure may also provide, in addition to flame resistance, other desired physical properties, such as heat resistance, and processability (including solvent solubility).

For the various embodiments, the curable compositions include an epoxy resin. An epoxy resin is a compound in having an epoxy group, which is where an oxygen atom is directly attached to two adjacent or non-adjacent carbon atoms of a carbon chain or ring system. The epoxy resin can be selected from the group consisting of aromatic epoxy compounds, alicyclic epoxy compounds, aliphatic epoxy compounds, and combinations thereof.

For the various embodiments, the curable compositions include an aromatic epoxy compound. Examples of aromatic epoxy compounds include, but are not limited to, glycidyl ether compounds of polyphenols, such as hydroquinone, resorcinol, bisphenol A, bisphenol F, 4,4'-dihydroxybiphenyl, phenol novolac, cresol novolac, trisphenol (tris-(4-hydroxyphenyl)methane), 1,1,2,2-tetra(4-hydroxyphenyl)ethane, tetrabromobisphenol A, 2,2-bis(4-hydroxyphenyl)-1,1,1,3,3,3-hexafluoropropane, 1,6-dihydroxynaphthalene, and combinations thereof.

For the various embodiments, the curable compositions include an alicyclic epoxy compound. Examples of alicyclic epoxy compounds include, but are not limited to, polyglycidyl ethers of polyols having at least one alicyclic ring, or compounds including cyclohexene oxide or cyclopentene oxide obtained by epoxidizing compounds including a cyclohexene ring or cyclopentene ring with an oxidizer. Some particular examples include, but are not limited to, hydrogenated bisphenol A diglycidyl ether; 3,4-epoxycyclohexylmethyl-3,4-epoxycyclohexyl carboxylate; 3,4-epoxy-1-methylcyclohexyl-3,4-epoxy-1-methylhexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate; bis(3,4-epoxycyclohexylmethyl)adipate; methylene-bis(3,4-epoxycyclohexane); 2,2-bis(3,4-epoxycyclohexyl)propane; dicyclopentadiene diepoxide; ethylene-bis(3,4-epoxycyclohexane carboxylate); dioctyl epoxyhexahydrophthalate; di-2-ethylhexyl epoxyhexahydrophthalate; and combinations thereof.

For the various embodiments, the curable compositions include an aliphatic epoxy compound. Examples of aliphatic epoxy compounds include, but are not limited to, polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers. Some particular examples include, but are not limited to glycidyl ethers of polyols, such as 1,4-butanediol diglycidyl ether; 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol; and a diglycidyl ether of polypropylene glycol; polyglycidyl ethers of polyether polyols obtained by adding one type, or two or more types, of alkylene oxide to aliphatic polyols such as propylene glycol, trimethylol propane, and glycerin; diglycidyl esters of aliphatic long-chain dibasic acids; and combinations thereof.

For the various embodiments, the epoxy resin can be used in an amount of from 1 wt. % to 99 wt. %, based on a total weight of the curable composition; for example, the epoxy resin can be used in an amount of 20 wt. % to 90 wt. %, and preferably in an amount of 20 wt. % to 60 wt. %, based on a total weight of the curable composition.

For the various embodiments, the curable compositions include the non-halogen flame retardant agent comprising at least two of an aryl-cyanato group and at least two of a phosphorus group. As used herein, the aryl-cyanato group can be a mono- or polycyclic aromatic hydrocarbon group that include at least one cyanato group (—OCN) attached thereto. In addition, the phosphorus group can also be a mono- or polycyclic aromatic hydrocarbon group that includes at least a phosphorous atom attached thereto.

For the various embodiments, such a non-halogen flame retardant agent can be represented by a compound of Formula (I):

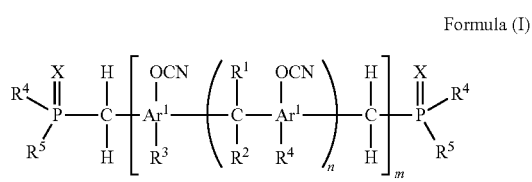

Formula (I)

wherein m is an integer from 1 to 20; wherein n is an integer from 0 to 20 with the proviso that when n is 0 then m is an integer from 2 to 20; wherein X is selected from the group consisting of sulfur, oxygen, a lone electron pair, and combinations thereof; wherein each $R^1$ and $R^2$ is independently a hydrogen, an aliphatic moiety having 1 to 20 carbon atoms, an aromatic hydrocarbon moiety having 6 to 20 carbon atoms, where the aliphatic moiety and the aromatic hydrocarbon moiety can be joined to form a cyclic structure; wherein $R^3$ is selected from the group consisting of a hydrogen, an aliphatic moiety having 1 to 20 carbon atoms, an aromatic hydrocarbon moiety having 6 to 20 carbon atoms, $R^4R^5P(\!=\!X)CH_2$—, and $ROCH_2$—, where R is an aliphatic moiety having 1 to 20 carbon atoms; and wherein each $R^4$ and $R^5$ is independently an aliphatic moiety having 1 to 20 carbon atoms, an aromatic hydrocarbon moiety having 6 to 20 carbon atoms, where the aliphatic moiety and the aromatic hydrocarbon moiety can be joined to form a cyclic structure, RX—, or wherein $R^4$ and $R^5$ together are $Ar^2X$—; and wherein each $Ar^1$ and $Ar^2$ is independently a benzene, a naphthalene, or a biphenyl.

As used herein, an aliphatic moiety includes saturated or unsaturated linear or branched hydrocarbon groups. This term is used to encompass, for example, alkyl, alkenyl, and alkynyl groups. As used herein, an aromatic hydrocarbon moiety includes mono- or polynuclear aromatic hydrocarbon groups.

As discussed herein, the non-halogen flame retardant agent of the present disclosure is then obtainable from the reaction of the DOP-BN and a compound such as a cyanogen halide (e.g., cyanogen bromide) that reacts with a hydroxy group on the DOP-BN to yield a cyanato group forming the non-halogen flame retardant agent (CE-DOP-BN). For the various embodiments, the CE-DOP-BN can have a conversion percentage of hydroxyl groups to cyanato groups within a range of from 20% to 100%, preferably within a range of from 40% to 100%, and more preferably within a range of from 50% to 100%.

Preferred non-halogen flame retardant agents of Formula (I) include those where X is oxygen, n is 1, m is 1, each $R^1$ and $R^2$ is a methyl group (Me), $R^3$ is $R^4R^5P(\!=\!X)CH_2$—, and $R^4$ and $R^5$ together are $Ar^2X$, wherein $Ar^2$ is biphenyl such that $R^4R^5P(\!=\!X)$— is represented by a compound of Formula (II):

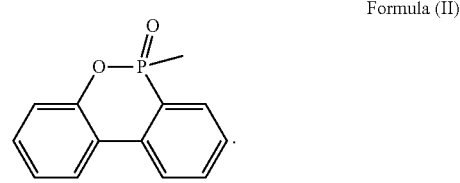 [SMILES: CP1(=O)Oc2ccccc2-c2ccccc21]

Formula (II)

Additional preferred non-halogen flame retardant agents of Formula (I) include those were X is oxygen, n is 0, m is 2 or 3, $R^3$ is $R^4R^5P(\!=\!X)CH_2$—, and $R^4$ and $R^5$ together are $Ar^2X$, wherein $Ar^2$ is biphenyl such that $R^4R^5P(\!=\!X)$— is represented by the compound of Formula (II). Additional preferred non-halogen flame retardant agents of Formula (I) are those in which $R^4R^5P(\!=\!X)CH_2$— is $(C_2H_5O)_2P(\!=\!O)$—, $(PhO)_2P(\!=\!O)$—, $Ph(MeO)P(\!=\!O)$—, and $Ph_2P(\!=\!O)$—, where Ph is a phenyl group ($C_6H_5$—). Preferably, $Ar^1$ is benzene. Additional structures for $R^4R^5P(\!=\!X)$— include:

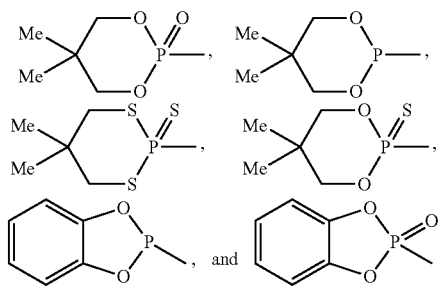

As used herein, the at least two of the phosphorus group for the non-halogen flame retardant agent can be derived from (9,10-dihydro-9-oxa-10-phosphaphenanthrene-10-oxide) (H-DOP).

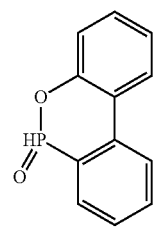

(H-DOP)

The H-DOP is commercially available under the Trade name "Sanko-HCA" from Sanko of Japan, or "Polydis® PD 3710", which is commercially available from Struktol® of Germany.

For the various embodiments, the H-DOP can be reacted with an etherified resole. Examples of suitable etherified resole include butyl ether bisphenol-A resoles, which are made with bisphenol A, formaldehyde and n-butanol. The etherified resole are typically a mixture of monomeric, dimeric and oligomeric structures. Examples of commercially available etherified resoles include SANTOLINK™ EP 560, which is a butyl etherified phenol formaldehyde condensation product and PHENODUR™ VPR 1785/50, which is a butoxymethylated phenol novolac, which the manufacturer characterizes as a highly butyl etherified resole based on a cresol mixture with a weight average molecular weight from 4000 to 6000 and a polydispersity from 2 to 3. Both of these products are available from UCB Group, a company headquartered in Brussels, Belgium, and its affiliate, UCB GmbH & Co. KG, a company incorporated in Germany. Other resole compounds available from UCB include for example PHENODUR™ PR 401, PHENODUR™ PR 411, PHENODUR™ PR 515, PHENODUR™ PR 711, PHENODUR™ PR 612, PHENODUR™ PR 722, PHENODUR™ PR 733, PHENODUR™ PR 565, and PHENODUR™ VPR 1775.

An example of the butyl ether bisphenol-A resole is shown below:

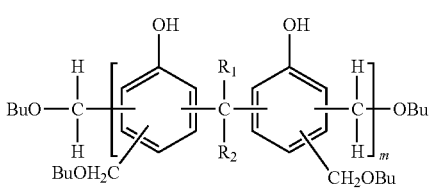

where Bu is a butyl group and m can be an integer of 1 to 10. As discussed herein, the butyl ether bisphenol-A resole may be present as a combination of monomers, dimers and/or oligomers of the butyl ether bisphenol-A resole. In addition, one or more of the butyl ether groups (—CH$_2$OBu) in the ortho positions in the butyl ether bisphenol-A resole can be replaced with other groups, such as —H, and —CH$_2$OH. The above structure is a simplification of the actual structure. As is well known in the art, some of the bridging groups can be —CH$_2$OCH$_2$— rather than methylene bridges. This can be controlled by the process parameters used to make the resole (catalyst type, pH, alcohol concentration, and temperature among others).

For the various embodiments, the active phosphorous compound (such as H-DOP) can be reacted with the etherified resole by blending or mixing them together to form a reactive composition. The reactive composition can be heated to initiate the reaction of the two components to form an alcohol and form the phosphorus polyphenol intermediate. For the various embodiments, the reaction temperature is preferably below the decomposition temperature of the starting materials. Generally, the reaction temperature is greater than 100 degrees Celsius (° C.), preferably greater than 120° C., and more preferably greater than 150° C. The reaction is preferably carried out for a period of time sufficient to a react the H—P-moieties of the H-DOP with the —OBu moieties of the butyl ether bisphenol-A resole. The time of reaction is typically from 60 minutes to 12 hours, preferably from 2 hours to 6 hours, and more preferably from 2 hours to 4 hours.

For the various embodiments, the reaction is preferably carried out without the presence of water (generally the water is present in less than 5 wt. %, more preferable less than 3 wt. %, and most preferable less than 1 wt. %) because water may tend to react with the H-DOP. Removal of the alcohol co-product generally helps drive the reaction to completion. The pressure in the reaction vessel is therefore preferably reduced to a pressure below atmospheric pressure, such as a pressure of 0.1 bar or less, to help drive off the alcohol or byproducts at a temperature below the above-mentioned lowest decomposition temperature. The reaction vessel may optionally be purged with a gas or volatile organic liquid to further assist in removing byproduct(s). The gas or volatile organic liquid is preferably inert to the contents of the reaction vessel. An example of such an inert gas includes, but is not limited to, nitrogen gas.

The butyl ether bisphenol-A resole is usually dissolved in an organic solvent, such as butanol, xylene, or Dowanol™ PM (The Dow Chemical Company); and part of the solvent can be removed either by heat or applying vacuum to the solution before the addition of H-DOP. The H-DOP and the etherified resole are preferably combined at a weight ratio (H-DOP:etherified resole) in the range from 10:1 to 1:10, preferably from 5:1 to 1:5, more preferably from 2:1 to 1:2, most preferably in the range from 1.1:1 to 1:1.1 based on total solids content of the composition. If desired, other materials such as catalysts or solvents may be added to the reaction mixture of the H-DOP and the etherified resole.

For the various embodiments, the reaction products of the H-DOP and the butyl ether bisphenol-A resole displaces most, but not necessarily all, of the butyl ether groups present on the butyl ether bisphenol-A resole. The resulting compounds, referred to herein as DOP-BN, are shown below.

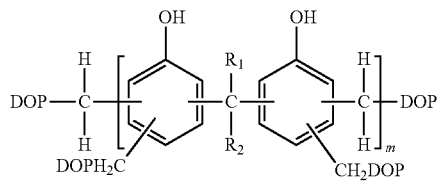

Generally, the DOP-BN reaction products from the reaction of H-DOP and the etherified resole is a mixture of oligomers (m=1 through 20). The number average degree of polymerization of the phosphorus polyphenol product is related to the molecular weight of the etherified resole starting material.

For the various embodiments, the non-halogen flame retardant agents of Formula (I) provided herein can be prepared by reacting DOP-BN with a compound that will react with a hydroxy group to yield a cyanato group. Examples of such compounds include cyanogen halides, such as cyanogen bromide and cyanogen chloride. The reaction is conducted in the presence of a base that can include alkali metal hydroxides and/or aliphatic amines, such as triethylamine and/or sodium hydroxide.

For the various embodiments, the reaction can be conducted at a low temperature in view of the exothermic nature of the reaction and the volatility of the cyanogen halide. For example, the reaction temperature can be from −40° C. to 40° C., preferably −20° C. to 10° C. The use of inert organic solvents is possible, where such inert organic solvents include, but are not limited to, aromatic hydrocarbons, such as benzenes, toluene or xylene; ethers, such as diethyl ether or tetrahydrofuran; halogenated aliphatic or aromatic hydrocarbons, such as methylene chloride or chlorobenzene; and/or ketones, such as acetone, methyl ethyl ketone or methyl isobutyl ketone.

For the various embodiments, the curable composition of the present disclosure can have a phosphorus content of at least 0.1 wt. % to 3.5 wt. %; for example, the curable composition of the present disclosure can have a phosphorus content of at least 2.2 wt. % to 3.0 wt. %, based on the total weight of the curable composition.

For the various embodiments, the non-halogen flame retardant agent is used in an amount within a range of from 1 wt. % to 90 wt. %, preferably within a range of from 10 wt. % to 60 wt. %, and still more preferably within a range of from 20 wt. % to 50 wt. %, based on the total weight of the curable composition.

For the various embodiments, the curable composition can also include a styrene and maleic anhydride copolymer. Styrene and maleic anhydride copolymers are polymers that are formed with styrene and maleic anhydride monomers. For the various embodiments, the styrene and maleic anhydride copolymer has a first constitutional unit of the formula (III):

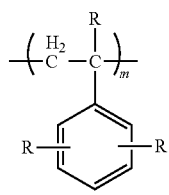

(III)

a second constitutional unit of the formula (IV):

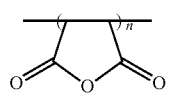

(IV)

where each m and n is independently a real number that represents a mole fraction of the respective constitutional unit in the styrene and maleic anhydride copolymer, and each R is independently a hydrogen, an aromatic group or an aliphatic group. As used herein, "constitutional units" refer to the smallest constitutional unit (a group of atoms comprising a part of the essential structure of a macromolecule), or monomer, the repetition of which constitutes a macromolecule, such as a polymer.

For various embodiments, the mole fraction m is within a range of from 0.50 to 0.89 and the mole fraction n is within a range of from 0.11 to 0.50, where (m+n)=1.00. For the embodiments, m and n are each greater than zero. With respect to each R group, examples of the aromatic group include, but are not limited to, phenyl, biphenyl, naphthyl, substituted phenyl or biphenyl, and naphthyl. Examples of the aliphatic group include, but are not limited to, alkyl and alicyclic alkyl.

The styrene and maleic anhydride copolymers used in the present disclosure can be selected from styrene and maleic anhydride copolymers or mixtures of styrene and maleic anhydride copolymers having a styrene to maleic anhydride molar ratio within a range of from 1.0:1.0 to 8.0:1.0, preferably within a range of from 1.0:1.0 to 6.0:1.0 and with a weight average molecular weight (Mw) that is less than 50,000 grams per mole (g/mol), preferably less than 20,000 g/mol, and still more preferably less than 10,000 g/mol. The weight average molecular weight can be determined by gel permeation chromatography (GPC).

For the various embodiments, the curable compositions used the styrene and maleic anhydride copolymer in an amount within a range of from 10 wt. % to 90 wt. %, preferably within a range of from 20 wt. % to 80 wt. %, and more preferably within a range of from 20 wt. % to 60 wt. %, based on the total weight of the curable composition. For the various embodiments, the curable compositions have a molar ratio of an epoxy group to a maleic anhydride group within a range of from 1.0:1.0 to 2.6:1.0, preferably within a range of from 1.3:1.0 to 1.8:1.0, and most preferably within a range of from 1.3:1.0 to 1.4:1.0.

Commercial examples of such styrene and maleic anhydride copolymer include, but are not limited to, SMA® EF-40, SMA® EF-60, SMA® EF-80, and SMA® 1000 all of which are available from Sartomer Company, Inc.

In additional embodiments, the styrene and maleic anhydride copolymer can be modified to include an aniline compound. The aniline compound can be used to react with part of the maleic anhydride groups in the styrene and maleic anhydride copolymer. The modified styrene and maleic anhydride copolymer (also referred to herein as a "terpolymer") can be incorporated into curable compositions to provide desirable thermal properties and electrical properties. The modified styrene and maleic anhydride copolymer can be incorporated into curable compositions to provide desirable thermal properties and electrical properties. Forming the modified styrene and maleic anhydride copolymer is discussed in International Patent Application number PCT/CN2011/076661 titled "CURABLE COMPOSITIONS", The Dow Chemical Company docket number 70069, the disclosure which is incorporated herein by reference.

For the various embodiments, the modified styrene and maleic anhydride polymer can be a terpolymer having a first constitutional unit of the formula (III):

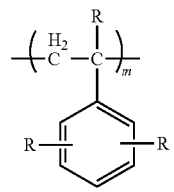

(III)

a second constitutional unit of the formula (IV):

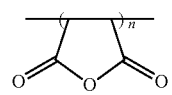

(IV)

and a third constitutional unit of the formula (V):

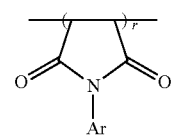

(V)

where each m, n and r is independently a real number that represents a mole fraction of the respective constitutional unit in the terpolymer, each R is independently a hydrogen, an aromatic group or an aliphatic group, Ar is an aromatic radical, and where the epoxy group to the second constitutional unit has a molar ratio in a range of 1.0:1.0 to 2.7:1.0. In various embodiments, each R is hydrogen and Ar is a phenyl group.

For various embodiments, the mole fraction m is 0.50 or greater and the mole fractions n and r are each independently 0.45 to 0.05, where (m+n+r)=1.00. For various embodiments, the first constitutional unit to the second constitutional unit has a molar ratio in a range of 1:1 to 20:1; for example, the molar ratio of the first constitutional unit to the second constitutional unit can have a range of 3:1 to 15:1.

For various embodiments, the second constitutional unit constitutes 0.10 wt. % to 41 wt. %, based on a total weight of the terpolymer. In one embodiment, the second constitutional unit constitutes 5.0 wt. % to 20 wt. %, based on the total weight of the terpolymer. For various embodiments, the third constitutional unit constitutes 0.10 wt. % to 62.69 wt. %, based on the total weight of the terpolymer. In one embodiment, the third constitutional unit constitutes 0.50 wt. % to 50 wt. %, based on the total weight of the terpolymer.

For various embodiments, the styrene and maleic anhydride copolymers are modified with the aromatic amine compound. Specific examples of the aromatic amine compound include, but are not limited to, aniline, substituted aniline, naphthalene amine, substituted naphthalene amine, and combinations thereof.

For the embodiments incorporating the modified styrene and maleic anhydride copolymer, the modified styrene and maleic anhydride copolymer can be used in an amount within a range of from 10 wt. % to 90 wt. %, preferably within a range of from 20 wt. % to 80 wt. %, and more preferably within a range of from 20 wt. % to 60 wt. %, based on the total weight of the curable composition. Additionally, for the embodiments incorporating the modified styrene and maleic anhydride copolymer, the curable compositions can have a molar ratio of an epoxy group to the styrene and maleic anhydride copolymer within a range of from 1.0:1.0 to 2.6:1.0, preferably within a range of from 1.3:1.0 to 1.8:1.0, and most preferably within a range of from 1.3:1.0 to 1.4:1.0.

The embodiments of the present disclosure can also be useful in other applications requiring flame resistant materials, including semiconductor packaging applications, electrical and electronic applications, and composite applications. In addition, the non-halogen flame retardant agent is substantially free of both bromine atoms and of halogen atoms (e.g., fluorine, chlorine, iodine, and astatine).

The curable compositions of the present disclosure described above may also optionally make use of a curing catalyst, a filler, a solvent, and combinations thereof. Examples of suitable curing catalysts include, but are not limited to, Zinc(II) 2-ethylhexanoate, or other transition metal cations and mixtures thereof, 2-methyl imidazole, 2-phynyl imidazole, 2-ethyl-4-methyl imidazole, 1-benzyl-2-phenylimidazole, boric acid, triphenylphosphine, tetraphenylphosphonium-tetraphenylborate, and mixtures thereof. The curing catalysts can be used in an amount within a range of from 0.01 wt. % to 10 wt. %, preferably 0.05 wt. % to 5.0 wt. %, and still more preferably within a range of from 0.05 wt. % to 2.0 wt. %, based on the total weight of the curable composition.

Examples of suitable fillers include, but are not limited to, fused silica, aluminium hydroxide, talc powder, mica powder, etc., and combinations thereon. The filler can be used in an amount within a range of from 10 wt. % to 80 wt. %, preferably, 10 wt. % to 75 wt. %, and still more preferably within a range of from 10 wt. % to 50 wt. %, based on the total weight of the curable composition.

Examples of suitable solvents include, but are not limited to, methyl ethyl ketone, dimethylformamide, cyclohexanone, propylene glycol methyl ether acetate, and combinations thereof. The solvent can be used in an amount within a range of from 20wt. % to 80 wt. %, preferably, 20 wt. % to 70 wt. %, and still more preferably within a range of from 30 wt. % to 50 wt. %, based on the total weight of the curable composition.

Because of their unique combination of properties, the curable compositions of the present disclosure may be useful in the preparation of various articles of manufacture. Thus, the disclosure also includes prepregs of the above composition as well as shaped articles, reinforced compositions, laminates, electrical laminates, coating, molded articles, adhesives, composite products as hereinafter described from cured or partially cured curable compositions of the disclosure. In addition, the curable compositions of the disclosure can be used for various purposes in the form of a dried powder, pellets, a homogeneous mass, impregnated products and/or compounds.

For the various embodiments, the curable composition having the non-halogen flame retardant agent can be used to prepare a resin sheet, a resin clad metal foil, a prepreg, a laminated board, or a multi-layer board, among other items. In an additional embodiment, the curable composition having the non-halogen flame retardant agent of the present disclosure can further include a resin, such as a bismaleimide-triazine epoxy resin, where the non-halogen flame retardant agent of the present disclosure and the resin can be used to prepare the aforementioned items.

A variety of additional additives may be added to the composition of the present disclosure. Examples of these additional additives include fibrous reinforcement, fillers, pigments, dyestuffs, thickening agents, wetting agents, lubricants, flame-retardants and the like.

Embodiments of the present disclosure provide prepregs that includes a reinforcement component and the curable composition, as discussed herein. The prepreg can be obtained by a process that includes impregnating a matrix component into the reinforcement component. The matrix component surrounds and/or supports the reinforcement component. The disclosed curable compositions can be used for the matrix component. The matrix component and the reinforcement component of the prepreg provide a synergism. This synergism provides that the prepregs and/or products obtained by curing the prepregs have mechanical and/or physical properties that are unattainable with only the individual components.

The reinforcement component can be a fiber. Examples of fibers include, but are not limited to, glass, aramid, carbon, polyester, polyethylene, quartz, metal, ceramic, biomass, and combinations thereof. The fibers can be coated. An example of a fiber coating includes, but is not limited to, boron.

Examples of glass fibers include, but are not limited to, A-glass fibers, E-glass fibers, C-glass fibers, R-glass fibers, S-glass fibers, T-glass fibers, and combinations thereof. Aramids are organic polymers, examples of which include, but are not limited to, Kevlar®, Twaron®, and combinations thereof. Examples of carbon fibers include, but are not limited to, those fibers formed from polyacrylonitrile, pitch, rayon, cellulose, and combinations thereof. Examples of metal fibers include, but are not limited to, stainless steel, chromium, nickel, platinum, titanium, copper, aluminum, beryllium, tungsten, and combinations thereof. Examples of ceramic fibers include, but are not limited to, those fibers formed from aluminum oxide, silicon dioxide, zirconium dioxide, silicon nitride, silicon carbide, boron carbide, boron nitride, silicon boride, and combinations thereof. Examples of biomass fibers include, but are not limited to, those fibers formed from wood, non-wood, and combinations thereof.

The reinforcement component can be a fabric. The fabric can be formed from the fiber, as discussed herein. Examples of fabrics include, but are not limited to, stitched fabrics, woven fabrics, and combinations thereof. The fabric can be unidirectional, multiaxial, and combinations thereof. The reinforcement component can be a combination of the fiber and the fabric.

The prepreg is obtainable by impregnating the matrix component into the reinforcement component. Impregnating the matrix component into the reinforcement component may be accomplished by a variety of processes. The prepreg can be formed by contacting the reinforcement component and the matrix component via rolling, dipping, spraying, or other such procedures. After the prepreg reinforcement component has been contacted with the prepreg matrix component, the solvent can be removed via volatilization. While and/or after the solvent is volatilized the prepreg matrix component can be cured, e.g. partially cured. This volatilization of the solvent and/or the partial curing can be referred to as B-staging. The B-staged product can be referred to as the prepreg.

For some applications, B-staging can occur via an exposure to a temperature of 60° C. to 250° C.; for example, B-staging can occur via an exposure to a temperature from 65° C. to 240° C., or 70° C. to 230° C. For some applications, B-staging can occur for a period of time of 1 minute to 60 minutes; for example B-staging can occur for a period of time from, 2 minutes to 50 minutes, or 5 minutes to 40 minutes. However, for some applications the B-staging can occur at another temperature and/or another period of time.

One or more of the prepregs may be cured (e.g. more fully cured) to obtain a cured product. The prepregs can be layered and/or formed into a shape before being cured further. For some applications (e.g., when an electrical laminate is being produced) layers of the prepreg can be alternated with layers of a conductive material. An example of the conductive material includes, but is not limited to, copper foil. The prepreg layers can then be exposed to conditions so that the matrix component becomes more fully cured.

One example of a process for obtaining the more fully cured product is pressing. One or more prepregs may be placed into a press where it subjected to a curing force for a predetermined curing time interval to obtain the more fully cured product.

The press may have a curing temperature of 80° C. to 250° C.; for example, the press may have a curing temperature of 85° C. to 240° C., or 90° C. to 230° C. For one or more embodiments, the press has a curing temperature that is ramped from a lower curing temperature to a higher curing temperature over a ramp time interval.

During the pressing, the one or more prepregs can be subjected to a curing force via the press. The curing force may have a value that is 10 kilopascals (kPa) to 350 kPa; for example the curing force may have a value that is 20 kPa to 300 kPa, or 30 kPa to 275 kPa. The predetermined curing time interval may have a value that is 5 seconds to 500 seconds; for example the predetermined curing time interval may have a value that is 25 seconds to 540 seconds, or 45 seconds to 520 seconds. For other processes for obtaining the cured product other curing temperatures, curing force values, and/or predetermined curing time intervals are possible. Additionally, the process may be repeated to further cure the prepreg and obtain the cured product.

Embodiments of the curable compositions may also include at least one of a synergist to help improve the flame out ability of the cured composition. Examples of such synergists include, but are not limited to, magnesium hydroxide, zinc borate, metalocenes and combinations there. In addition, embodiments of the compositions may also include adhesion promoters, such as modified organosilanes (epoxidized, methacryl, amino), acetylacetonates, sulfur containing molecules and combinations thereof. Other additives can include, but are not limited to, wetting and dispersing aids such as modified organosilanes, Byk® 900 series and W9010 (Byk-Chemie GmbH), modified fluorocarbons and combinations thereof; air release additives such as Byk® A530, Byk® A525, Byk® A555, and Byk® A560 (Byk-Chemie GmbH); surface modifiers such as slip and gloss additives; mold release agents such as waxes; and other functional additives or prereacted products to improve polymer properties such as isocyanates, isocyanurates, cyanate esters, allyl containing molecules or other ethylenically unsaturated compounds, acrylates and combinations thereof.

The heat necessary to provide the proper curing conditions can depend on the proportion of components constituting the composition and the nature of the components employed. In general, the composition of this disclosure may be cured by heating with a temperature within the range of 0° C. to 400° C., preferably 100° C. to 250° C., although differing according to the presence of a curing catalyst or curing agent or its amount, or the types of the components in the composition. The time required for heating can be 30 seconds to 10 hours, where the exact time will differ according to whether the resin composition is used as a thin coating or as molded articles of relatively large thickness or as laminates or as matrix resins for fiber reinforced composites, particularly for electrical and electronic applications (e.g., when applied to an electrically nonconductive material) and subsequently curing the composition.

EXAMPLES

The following examples are given to illustrate, but not limit, the scope of this invention.

Materials

Tetrahydrofuran, available from Sigma-Aldrich (hereinafter "Aldrich").

Anhydrous dichloromethane, available from Aldrich.

XZ 92741.00 (XZ92741, 57 wt. % DOP-BN in propylene glycol methyl ether solution), available from The Dow Chemical Company.

9,10- dihydro-9-oxa-10-phosphaphenanthrene-10-oxide (H-DOP, "Sanko-HCA"), available from Sanko of Japan.

EPICLONE HP 7200™ (HP7200, DCPD type epoxy resin), available from DIC Corporation.

SMA® EF-40 (SMA 40, styrenic and maleic anhydride copolymer), available from Sartomer Company, Inc. SMA 40 has a styrene to maleic anhydride molar ratio of 4:1 and a weight average molecular weight of 10,500.

SMA® EF-60 (SMA 60, styrenic and maleic anhydride copolymer), available from Sartomer Company, Inc. SMA 60 has a styrene to maleic anhydride molar ratio of 6:1 and a weight average molecular weight of 11,500.

SMA® 1000 (SMA 1000, styrenic and maleic anhydride copolymer), available from Sartomer Company, Inc. SMA 1000 has a styrene to maleic anhydride molar ratio of 1:1 and a weight average molecular weight of 5,500.

Butyl ether bisphenol-A resole (SANTOLINK™ EP 560, etherified resoles), available from UCB GmbH & Co.

Nitrogen, available from Air Products.

Cyanogen bromide, available from Aldrich.

Triethylamine, base, available from Aldrich.

Dichloromethane, available from Aldrich.

Granular anhydrous sodium sulfate, available from Aldrich.

2-butanone (methyl ethyl ketone (MEK), solvent), available from The Dow Chemical Company.

N-dimethylformamide (DMF, solvent), available from Sinopharm Chemical Co.

Zinc (II) 2-ethylhexanoate (Zn catalyst, solution: 10 wt. % in methyl ethyl ketone), curing catalyst, available from Sigma-Aldrich.

2-methyl imidazole (2M1, solution: 10 wt. % in methanol, curing catalyst), available from Sigma-Aldrich.

Synthesis of Solid DOP-BN

To prepare the solid DOP-BN, a 60 gram sample of XZ92741 was placed in a 32 ounce, wide-mouth, glass jar and then into a vacuum oven set at 100° C. for 18 hours to remove the solvents. The resultant solid material exhibited a fluffy, crystalline appearance. A 2.661 milligram sample was analyzed via thermogravimetric analysis on a TA Instruments, Q50 TGA under a 50 cubic centimeter per minute nitrogen purge according to the following procedure: Ramp from room temperature to 171° C. at 20° C./minute, Isotherm at 171° C. for 45 minutes. The total weight loss was measured at 2.8%.

High pressure liquid chromatographic (HPLC) analysis (UV detection at 254 and 305 nm with diode array, Prontosil 120-3-$C_{18}$-ace-EPS 3.0 um, 150×4.6 mm column, acetonitrile/water eluent (50/50 start with a gradient to 100% acetonitrile, 40° C., 1.0 milliliters per minute flow rate) of Masterblend A (the DOP-BN) revealed 21 components with 3 predominant components comprising 31.22 area %, 27.11 area % and 11.05 area %. Fourier transform infrared spectrophotometric (FTIR) analysis (Nicolet FT-IR Spectrometer) of a potassium bromide pellet of the DOP-BN revealed hydroxyl group absorbance at 3212.8 cm$^{-1}$ and a sharp strong aromatic band absorbance at 1431.0 cm$^{-1}$ due to phenyl ring directly attached to the phosphorus atom.

Analysis of DOP-BN by Electrospray Ionization Liquid Chromatography Mass Spectrometry Solid DOP-BN samples were dissolved into tetrahydrofuran (approximately 10% v/v) and five (5) microliter aliquots of these solutions were analyzed by liquid chromatography electrospray ionization mass spectrometry (ESI/LC/MS) on a Waters Alliance 2690 ternary gradient liquid chromatography system coupled to a Micromass QToF2, SN # UC-175, quadrupole/time of flight MS/MS system via a Micromass Z-spray electrospray (ESI) interface operating in the positive ion (PI) and negative ion (NI) modes. The following analysis conditions were used:

Column: 150×4.6 mm ID×5 μm, Zorbax SB-C3.
Mobile phase: A=DI Water w/0.05% Formic Acid and B=Tetrahydrofuran. Gradient Program: 80/20 v/v A/B hold 1 minute, to 5/95 v/v A/B at 21 minutes Curve 6, hold 5 minutes, Total Run time=26 minutes.
Column temperature: 45° C.
Flow: 1.0 milliliter per minutes (split 2:1 away from interface).
UV detection: Diode Array 210 to 400 nm.
ESI conditions: Source Block: 110° C. Desolvation: 280° C.
Capillary: +/−2.5 kV.
Cone: +/−20 V.
MS conditions: MCP: 2150V Mode: +/−ions.
  Scan: 50 to 4000 amu (+) Rate: 1.0 sec/scan
  Scan: 50 to 3000 amu (−) Rate: 1.0 sec/scan
Lockspray Mass Calibrant=(PI/NI) 12.5 microgram/milliliter solution of DE-638 (Penoxsulam™, Chem. Abs. 219714-96-2, C16H14F5N5O5S) in methanol (M+H+= 484.0714, M−H−=482.0558) at a flowrate of three (3) microliters per minute, one (1) scan acquired every five (5) seconds.
The ESI/LC/MS analysis provided the following proposed structures shown in Table I, where only those components present at greater than 5 area % were considered.

TABLE I

Assignments from ESI Analysis of the DOP-BN

| Area % | m/z Observed ESI/LC/MS | MW | Tentative Assignments |
|---|---|---|---|
| 45.1 (including a shoulder) | PI 114.2604 (M + H)+, 1163.2454 (M + Na)+, NI 1139.2275 (M − H)−, | 1140 | 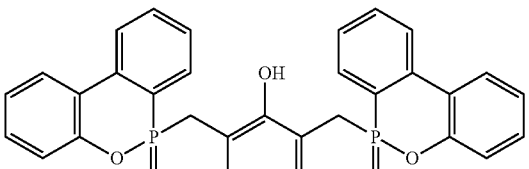 $C_{67}H_{52}O_{10}P_4$ 1140.251101 or isomer Error in Mass Measurement = 1.4 mDa at m/z 1141(+) |

TABLE I-continued
Assignments from ESI Analysis of the DOP-BN
| Area % | m/z Observed ESI/LC/MS | MW | Tentative Assignments |
|---|---|---|---|
| 17.2 | PI 999.2999 (M + H)+, 1021.2844 (M + Na)+, NI 997.2697 (M − H)−, | 998 | 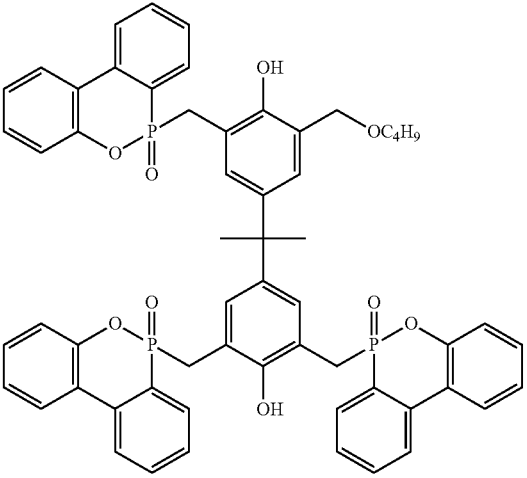 $C_{59}H_{53}O_9P_3$ 998.290248 or isomer Error in Mass Measurement = 1.9 mDa at m/z 999(+) |
| 15.7 | PI 1837.4532 (M + H)+, 1859.4479 (M + Na)+, NI — | 1836 | 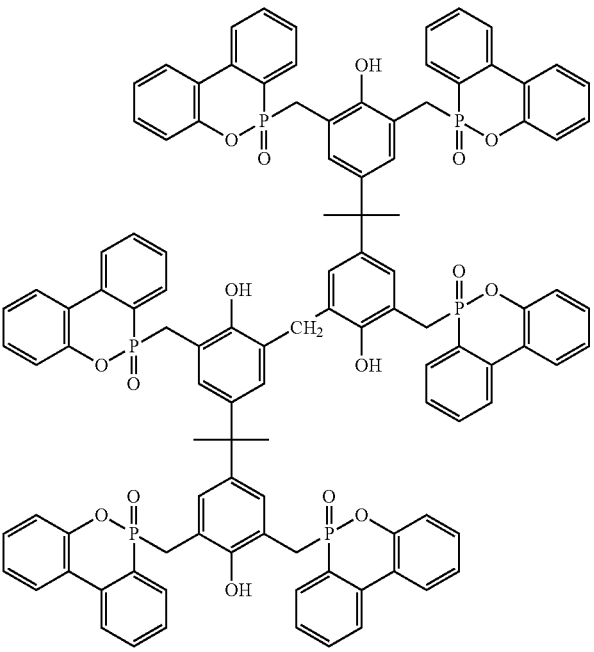 [SMILES: CC(C)(c1cc(Cc2cc(C(C)(C)c3cc(CP4(=O)Oc5ccccc5-c5ccccc54)c(O)c(CP4(=O)Oc5ccccc5-c5ccccc54)c3)cc(CP3(=O)Oc4ccccc4-c4ccccc43)c2O)c(O)c(CP2(=O)Oc3ccccc3-c3ccccc32)c1)c1cc(CP2(=O)Oc3ccccc3-c3ccccc32)c(O)c(CP2(=O)Oc3ccccc3-c3ccccc32)c1] $C_{109}H_{86}O_{16}P_6$ 1836.434167 or isomer Error in Mass Measurement = 11.3 mDa at m/z 1837(+) |

TABLE I-continued
Assignments from ESI Analysis of the DOP-BN
| Area % | m/z Observed ESI/LC/MS | MW | Tentative Assignments |
|---|---|---|---|
| 10.5 | PI 857.3348 (M + H)+, 879.3209 (M + Na)+, NI — And PI 1695.4910 (M + H)+, 1717.4763 (M + Na)+, NI — And PI 2533.6516 (M + H)+, 2555.6196 (M + Na)+, NI — | 856 And 1694 And 2532 (small) | 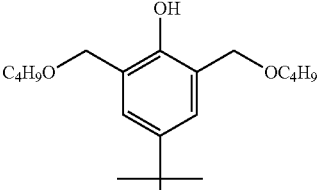<br>$C_{51}H_{54}O_8P_2$<br>856.329395<br>and<br>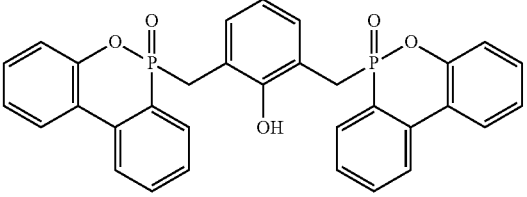<br>$C_{101}H_{87}O_{15}P_5$<br>1694.473314<br>plus |

TABLE I-continued

Assignments from ESI Analysis of the DOP-BN

| Area % | m/z Observed ESI/LC/MS | MW | Tentative Assignments |
|---|---|---|---|

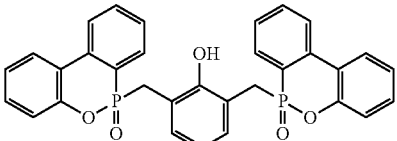

$C_{151}H_{120}O_{22}P_8$
2532.617233
Error in Mass Measurments = -2.4 mDa at m/z 857(+)
Error in Mass Measurments = 9.8 mDa at m/z 1695(+)
Error in Mass Measurments = 26.6 mDa at m/z 2533(+)

Synthesis of the Non-Halogen Flame Retardant Agent (CE-DOP-BN)

A 250 milliliter, three neck, glass, round bottom reactor was charged with the solid DOP-BN prepared as above (4.90 grams, 0.01 hydroxyl equivalent) and anhydrous dichloromethane (50 milliliters, 10.2 milliliter per gram of DOP-BN). The reactor was additionally equipped with a condenser (maintained at 0° C.), a thermometer, an overhead nitrogen inlet (1 liters per minute $N_2$ used), and magnetic stirring. The solution was stirred and its temperature was brought to 22° C.

Cyanogen bromide (1.134 grams, 0.0107 mole, 1.07:1 cyanogen bromide:hydroxyl equivalent ratio) was added to the solution and immediately dissolved therein. A dry ice-acetone bath for cooling was placed under the reactor followed cooling and equilibration of the stirred solution at -7° C. Triethylamine (1.03 grams, 0.0102 mole, 1.02 triethylamine:hydroxyl equivalent ratio) was added using a syringe in aliquots that maintained the reaction temperature at -7° C. to -3.5° C. The total addition time for the triethylamine was 12 minutes. Addition of the initial aliquot of triethylamine induced a light yellow color in the stirred solution which immediately turned colorless again. With further additions haziness indicative of triethylamine hydrobromide was observed. After 13 minutes of postreaction at -8° C. to -5° C. HPLC analysis (UV detection at 254 and 305 nm with diode array, Prontosil 120-3-$C_{18}$-ace-EPS 3.0 um, 150×4.6 mm column, acetonitrile/water eluent (50/50 start with a gradient to 100% acetonitrile, 40° C., 1.0 milliliters per minutes flow rate) of a sample of the reaction product revealed 31 components with every component present having a different retention time than those observed in the HPLC analysis of the DOP-BN. After a cumulative 32 minutes of postreaction at -8° C. to -5° C., the product slurry was added to a beaker of magnetically stirred deionized water (200 milliliters) and dichloromethane (50 milliliters) providing a mixture.

After 2 minutes of stirring, the mixture was added to a separatory funnel, allowed to settle, and then the dichloromethane layer recovered, with the aqueous layer discarded to waste. The dichloromethane solution was added back into the separatory funnel and extracted with fresh deionized water (100 milliliters) three additional times. The resultant hazy dichloromethane solution was dried over granular anhydrous sodium sulfate (5 grams) to give a clear solution which was then passed through a bed of anhydrous sodium sulfate (25 grams) supported on a 60 milliliter, medium fitted glass funnel attached to a side arm vacuum flask.

The clear, light yellow colored filtrate was rotary evaporated using a maximum oil bath temperature of 50° C. until the vacuum was <1 mm Hg. A total of 4.49 grams of white, crystalline product was recovered. FTIR analysis of a potassium bromide pellet of the polycyanate of DOP-BN revealed disappearance of the hydroxyl group absorbance, appearance of sharp strong cyanate group absorbance at 2253.7 and 2207.3 cm$^{-1}$, and maintenance of the sharp strong aromatic band absorbance at 1431.0 cm$^{-1}$ due to phenyl ring directly attached to the phosphorus atom.

Figure 2:
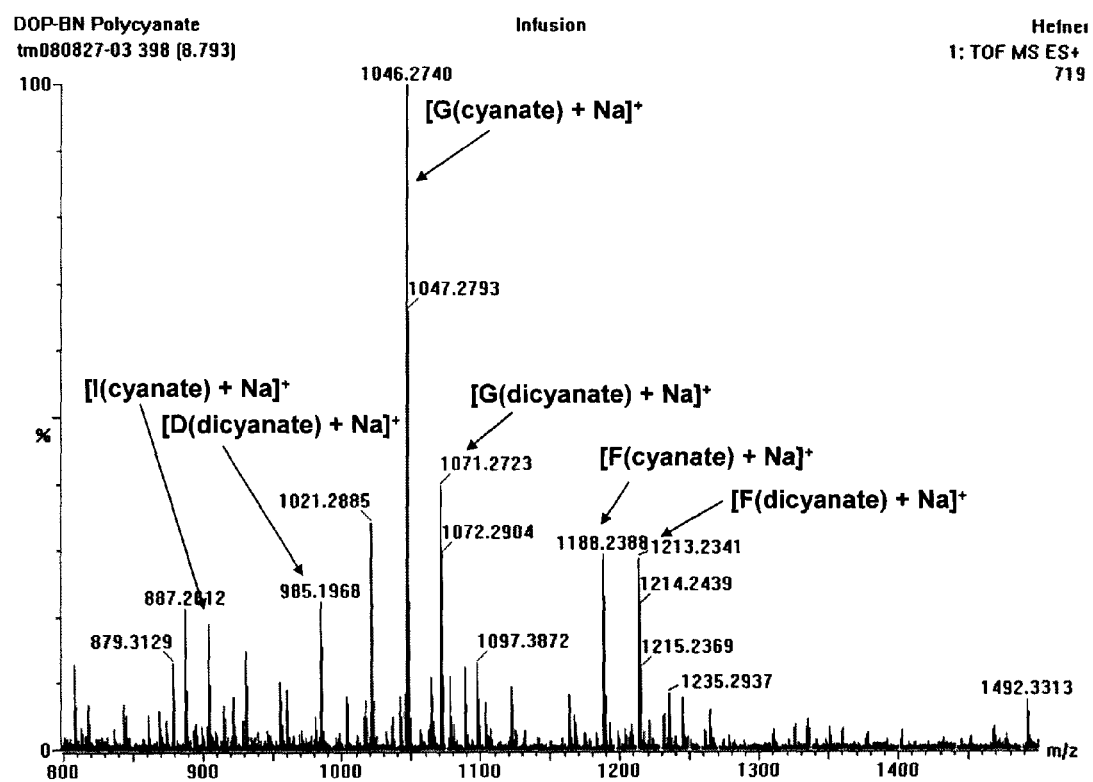
FIG. 2 provides an expanded positive electrospray ionization mass spectrum from a DOP-BN polycyanate (CE-DOP-BN) sample of the present disclosure.

HPLC/MS data indicate the conversion of the phenolic moieties into the desired cyanate ester functionality. FIG. 1 contains the positive ion ESI mass spectrum obtained by infusing a methanol solution of a sample of the polycyanate of DOP-BN. The major ions observed at masses 362.19 and 520.14 remain unidentified. FIG. 2 focused on the higher mass range. The elemental compositions for a number of these ions can be assigned based on the accurate mass measurements determined for these ions. The ions identified are the cyanate analogs of the phenolic compounds observed in the DOP-BN starting material. Both mono- and dicyanates are observed and are shown in Table II. Compound F(dicyanate) is the target compound for the CE-DOP-BN sample.

TABLE II

| Assignments from ESI Analysis of the Polycyanate of DOP-BN | | | |
|---|---|---|---|
| Compound ID | m/z Obsrvd Pos Ion | Nom MW | Tentative Assignments |
| D(dicyanate) | 985.1968 (M + Na)$^+$ | 962 | or isomer $C_{56}H_{41}N_2O_8P_3$ 962.207574 Da |
| E(cyanate) | 1188.2388 (M + Na)$^+$ | 1165 | or isomer $C_{68}H_{51}NO_{10}P_4$ 1165.246341 Da |

TABLE II-continued
Assignments from ESI Analysis of the Polycyanate of DOP-BN
| Compound ID | m/z Obsrvd Pos Ion | Nom MW | Tentative Assignments |
|---|---|---|---|
| F(dicyanate) | 1213.2341 (M + Na)+ | 1190 | 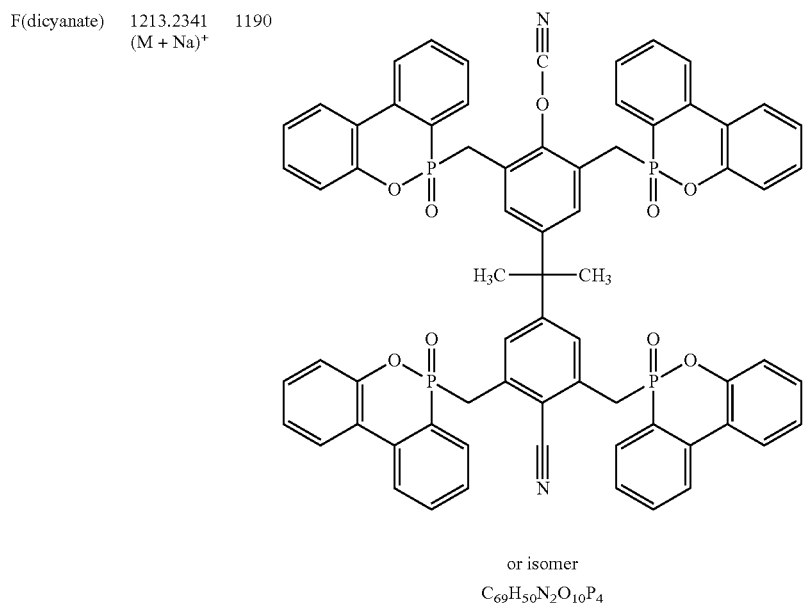 or isomer $C_{69}H_{50}N_2O_{10}P_4$ 1190.24159 Da |
| G(cyanate) | 1046.2740 (M + Na)+ | 1023 | 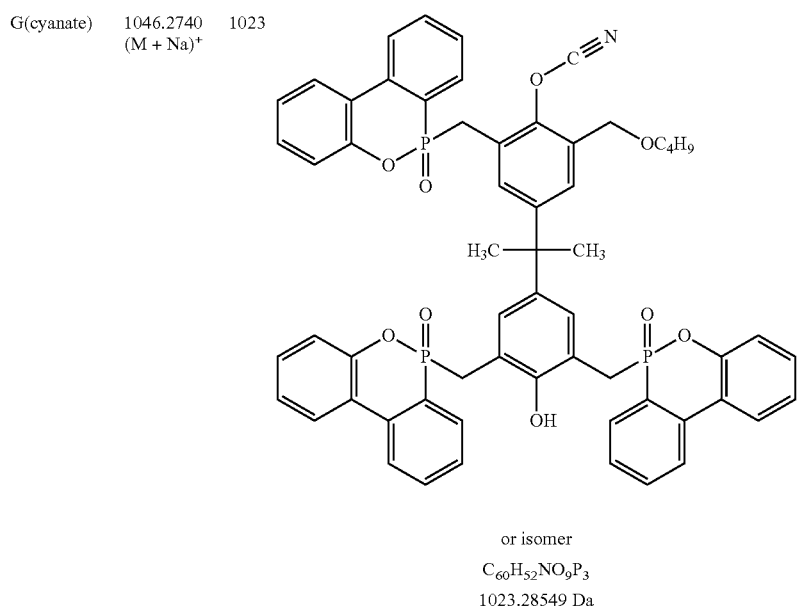 or isomer $C_{60}H_{52}NO_9P_3$ 1023.28549 Da |

TABLE II-continued

Assignments from ESI Analysis of the Polycyanate of DOP-BN

| Compound ID | m/z Obsrvd Pos Ion | Nom MW | Tentative Assignments |
|---|---|---|---|
| H(dicyanate) | 1071.2723 (M + Na)+ | 1048 | or isomer<br>C$_{61}$H$_{51}$N$_2$O$_9$P$_3$<br>1048.280739 Da |
| I(cyanate) | 904.3154 (M + Na)+ | 881 | or isomer<br>C$_{52}$H$_{53}$NO$_8$P$_2$<br>881.32464 Da |

Characterization of the Non-halogen Flame Retardant Agent

For the following examples, a sample of a synthesized non-halogen flame retardant agent (CE-BOP-BN) is characterized by the following methods.

FTIR: A sample of the non-halogen flame retardant agent (CE-DOP-BN) and a sample of the raw DOP-BN material were placed on the ATR crystal surface and analyzed by FTIR ATR directly. Thermo Nicolet model 6700 equipped with Smart DuraSampl IR Diamond ATR was used. Spectra were collected using Nicolet Omnic 7.3 software. The spectra are illustrated in FIG. 3.

Figure 3:
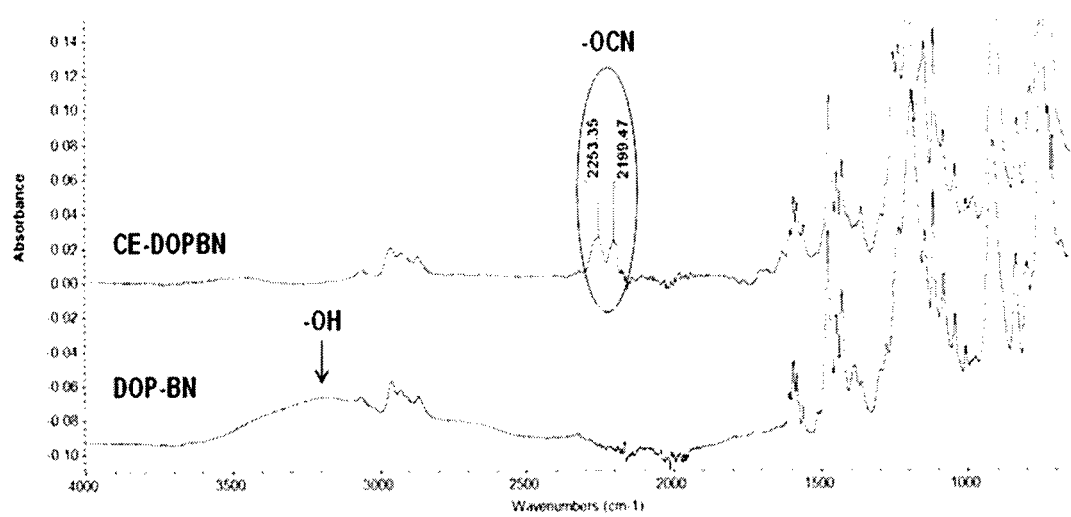
FIG. 3 provides Fourier Transform Infrared (FTIR) spectra from DOP-BN and DOP-BN polycyanate (CE-DOP-BN).

As seen in FIG. 3, the spectra of the raw material (DOP-BN) and the non-halogen flame retardant agent (CE-DOP-BN) are shown. In the FTIR spectrum of the raw material (DOP-BN), there is a broad peak at around 3200 cm$^{-1}$, which represents the hydroxyl group in the DOP-BN. After the reaction and seen on the non-halogen flame retardant agent (CE-DOP-BN) spectra, the peak is significantly reduced and two new peaks appeared at 2253 cm$^{-1}$ and 2199 cm$^{-1}$, respectively, which represent the cyanate group in the non-halogen flame retardant agent.

NMR: The NMR spectrum was recorded using a Bruker Avance III 400 megaHertz NMR spectrometer (Bruker, USA) in the Fourier transform mode.

Figure 4A:
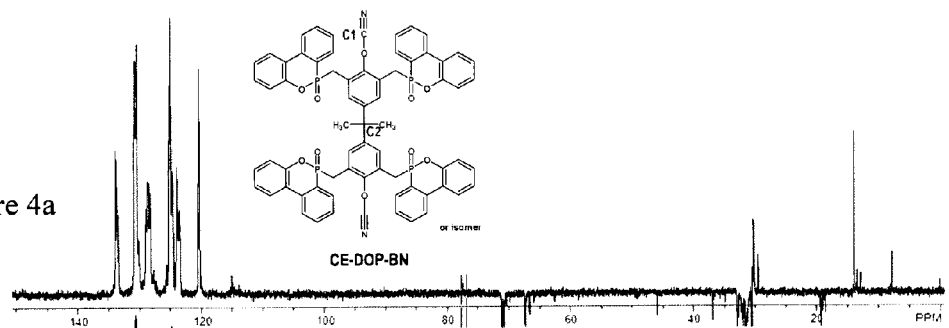
FIG. 4a provides distortionless enhancement by polarization transfer (DEPT) nuclear magnetic resonance (NMR) spectra from DOP-BN polycyanate (CE-DOP-BN).
Figure 4B:
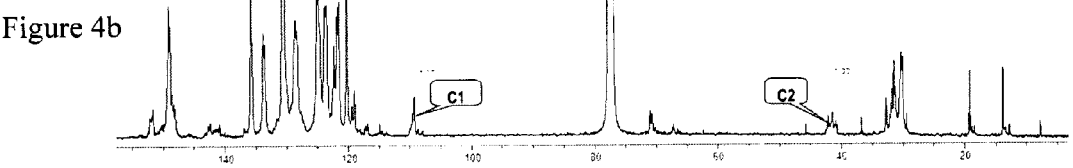
FIG. 4b provides quantitative $^{13}$C NMR from DOP-BN polycyanate (CE-DOP-BN).

Chloroform-d was used a solvent. FIGS. 4a and 4b illustrate the $^{13}$C NMR spectra of CE-DOP-BN. FIG. 4a is Distortionless Enhancement by Polarization Transfer (DEPT)

and FIG. 4b is quantitative $^{13}$C NMR. In FIG. 4b, the peak around 110 parts per million represents C1 in the —OCN group, and the peak at about 40 ppm represents the C2. According to the integration ratio of these two peaks in FIG. 4b, around 50% of the hydroxyl groups in the DOP-BN have been converted to —OCN.

Figure 5:
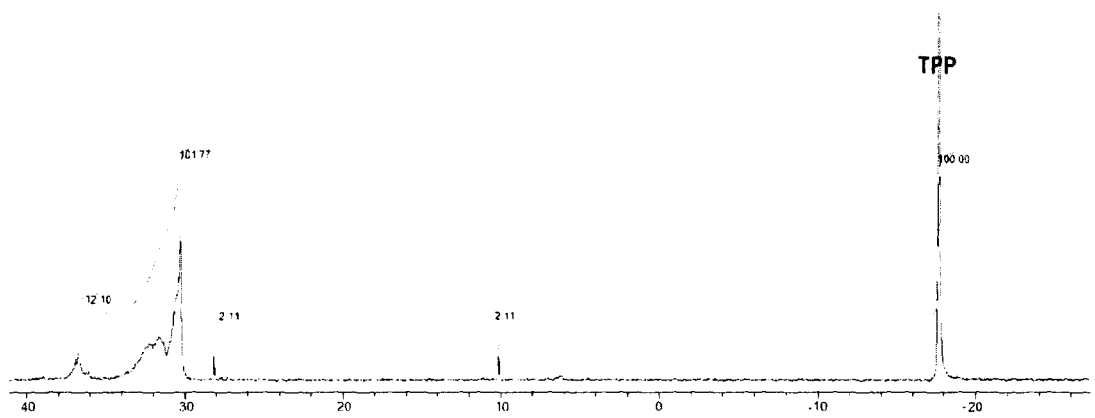
FIG. 5 provides quantitative $^{31}$P NMR spectra from DOP-BN polycyanate (CE-DOP-BN).

FIG. 5 illustrates the quantitative $^{31}$P NMR spectra of CE-DOP-BN. Triphenylphosphate (TPP) (99% purity and 9.5 wt% phosphorus content) was used as an internal standard. The integration ratio for the peaks for CE-DOP-BN and the peak at −18 ppm for TPP, the phosphorus content in CE-DOP-BN is about 8 wt. %.

Examples 1-4 and Comparative Examples A-D

Examples 1-4 illustrate curable compositions of the present disclosure including the non-halogen flame retardant agent and the styrene and maleic anhydride copolymer. Comparative Examples A-D illustrate curable compositions using DOP-BN instead of CE-DOP-BN as the non-halogen flame retardant agent.

Examples 1-4

CE-DOP-BN, an epoxy resin, a styrene and maleic anhydride copolymer, and a solvent were mixed together according to the formulations in Table III and shaken to form a uniform solution.

Comparative Examples A-D

DOP-BN, an epoxy resin, a styrene and maleic anhydride copolymer, and a solvent were mixed together according to the formulations in Table IV and shaken to form a uniform solution

TABLE III

Formulations of Examples 1-4

| | Units | Example 1 | Example 2 | Example 3 | Example 4 |
|---|---|---|---|---|---|
| Epoxy Resin (HP 7200) | g | 5.45 | 5.50 | 5.28 | 2.79 |
| CE-DOP-BN | g | 4.00 | 5.00 | 5.20 | 3.46 |
| DOP-BN | | — | — | — | — |
| SMA 1000 | g | 2.4 | — | — | — |
| SMA 40 | g | — | 4.3 | — | 4.0 |
| SMA 60 | g | — | — | 5.0 | — |
| MEK | g | 5.5 | 5.5 | 5.3 | 5.7 |
| DMF | g | 4.0 | 5.0 | 5.0 | 3.4 |
| Solid Content | % | 56% | 58% | 60% | 53% |
| P Content | % | 2.7 | 2.7 | 2.7 | 2.7 |
| Zn catalyst | mg | 30 | 150 | 20 | 80 |
| 2MI | mg | 30 | 150 | 20 | 40 |
| Gel time | s | 190 | 390 | 410 | 290 |

TABLE IV

Formulations of Comparative Examples A-D

| | Units | Comparative Example A | Comparative Example B | Comparative Example C | Comparative Example E |
|---|---|---|---|---|---|
| Epoxy Resin (HP 7200) | g | 5.45 | 5.50 | 5.28 | 2.79 |
| CE-DOP-BN | g | — | — | — | — |
| DOP-BN | | 4.00 | 5.00 | 5.20 | 3.46 |
| SMA 1000 | g | 2.4 | — | — | — |
| SMA 40 | g | — | 4.3 | — | 4.0 |
| SMA 60 | g | — | — | 5.0 | — |
| MEK | g | 8.5 | 10.3 | 10.3 | 6.8 |
| DMF | g | — | — | — | — |
| Solid Content | % | 58% | 59% | 60% | 60% |
| P Content | % | 3.0 | 3.0 | 3.0 | 3.0 |
| Zn catalyst | mg | — | — | — | — |
| 2MI | mg | 40 | 40 | 50 | 50 |
| Gel time | s | 240 | 280 | 290 | 230 |

Analysis of Examples 1-4 and Comparative Examples A-D

The curing catalysts, according to the formulations in Table III and Table IV, were added to the curable compositions of Examples 1-4 and Comparative Examples A-D, respectively. The gel time of the curable compositions was tested on a hot plate maintained at 171° C., which is where the remaining solvent becomes entrapped within the substantially ramified structure. The gel time can indicate a reactivity of the curable compositions (e.g. at a specific temperature) and can be expressed as the number of seconds to gel point. Gel point refers to the point of incipient polymer network formation wherein the structure is substantially ramified such that essentially each unit of the network is connected to each other unit of the network. When a curable composition reaches the gel point, the remaining solvent becomes entrapped within the substantially ramified structure. When the trapped solvent reaches its boiling point, bubbles can form in the structure (e.g. the prepreg, resulting in an undesirable product). Gel time can be controlled by the amount of the catalyst and it is often adjusted to 200 seconds to 400 seconds. The gel times for Examples 1-4 and Comparative Examples A-D as shown in Table III and IV.

Glass Transition Temperature: The gelled curable compositions were recovered from the hot plate surface and post-cured in an oven at 200° C. for 3 hours to form a cured product. The glass transition temperature ($T_g$) of the cured product was measured by Differential Scanning Calorimetry (DSC). The results are illustrated in Table V.

DSC is performed using a DSC-Q2000 under a flowing nitrogen atmosphere (50 ml/min). Samples, approximately ~10.0 mg of the cured products of Examples 1-4 and Comparative Examples A-D were placed in the DSC with the following cycles. Cycle one: initial temperature: 40° C., final temperature: 250° C., and a ramp rate=10° C./min. Cycle two: initial temperature: 250° C., final temperature: 20° C., and a ramp rate=−20° C./min. Cycle three: initial temperature: 40° C., final temperature: 250° C., and a ramp rate=10° C./min. Cycle four: initial temperature: 250° C., final temperature: 20° C., and a ramp rate=−20° C./min. Cycle five: initial temperature: 40° C., final temperature: 250° C., and a ramp rate=20° C./min. $T_g$ was determined from the five cycle.

Prepregs: The curable compositions of Examples 1-4 and Comparative Examples A-D were brushed on a glass fiber sheet (E-glass, Hexcel 7628) and the glass fiber sheet was put in a 177° C. oven with air flow for 180 seconds to obtain prepregs of Examples 1-4 and Comparative Examples A-D. The prepregs were crushed to collect prepreg powder of Examples 1-4 and Comparative Examples A-D.

Plaque Testing: Prepreg powders about 3 g of Examples 1-4 and Comparative Examples A-D were put on flat aluminum foil and then the aluminum foil with the prepreg powder was placed on a flat metal plate. The assembly was heated to 200° C. until the prepreg powder melted. The melted prepreg powder was covered with another aluminum foil sheet and then a flat metal plate was placed on the aluminum foil. The assembly was hot pressed at 200° C. for 1 hour and then was post cured at 200° C. for another 3 hours. An air bubble free plaque with a thickness of within a range of from 0.3 millimeters to 0.5 millimeters was obtained and the dielectric constant/dissipation factor ($D_k/D_f$) and the glass transition temperature ($T_g$) were determined. The glass transition temperature was determined using Dynamic Mechanic Thermal Analysis (DMTA). The testing is performed using a RSA III DMTA (TA instruments). The DMTA employed a frequency of 6.28 radian/s, an initial temperature of 30° C., a final temperature of 250° C., and a ramp rate of 3.0° C./min.

$D_k/D_f$ was analyzed at temperature by an Agilent 4991 A Impendence/Material Analyzer equipped with Agilent 16453A test fixture. Calibration was done using an Agilent Teflon standard plaque using $D_k/D_f$ parameters provided by vendor. The results are illustrated in Table V.

TABLE V

Results

| | $T_g$ by DSC (° C.) | $T_g$ by DMTA (° C.) | $D_k/D_f$ @ 1 GHz |
|---|---|---|---|
| Example 1 | 185 | 191 | 3.10/0.011 |
| Example 2 | 185 | 192 | 3.10/0.009 |
| Example 3 | 176 | 182 | 3.13/0.008 |
| Example 4 | 181 | 191 | 2.90/0.006 |
| Comparative Example A | 174 | 142/181 | 3.0/0.011 |
| Comparative Example B | 167 | 133/174 | 3.06/0.009 |
| Comparative Example C | 159 | 169 | 3.02/0.008 |
| Comparative Example D | — | 175 | 3.14/0.008 |

As seen in Table V, Examples 1-3, (having the CE-DOP-BN) show a higher glass transition temperature than the corresponding Comparative Examples A-C (having DOP-BN), while maintaining similar $D_k$ and $D_f$ values. For example, Example 1 (having a $D_k/D_f$ of 3.10/0.011) is compared with Comparative Example A (having a $D_k/D_f$ of 3.00/0.011), Example 2 (having a $D_k/D_f$ of 3.10/0.009) is compared to Comparative Example B (having a $D_k/D_f$ of 3.06/0.009), and Example 3 (having a $D_k/D_f$ of 3.13/0.008) is compared to Comparative Example C (having a $D_k/D_f$ of 3.02/0.008). The results indicate that the CE-DOP-BN can increase the glass transition temperature, while maintaining similar $D_k$ and $D_f$ values. Moreover, Comparative Examples A and B show two glass transition temperatures, which is undesirable. For example, having two glass transition temperatures indicates that there is a phase separation of the cured resins such that each phase is providing a separate glass transition temperature.

Comparing Example 2 with Example 4 illustrates that when the ratio of raw materials change, the $D_k/D_f$ values change. For example, Example 2 has 5.0 g of CE-DOP-BN and 4.3 g of SMA 40, whereas Example 4 has 3.46 g of CE-DOP-BN and 4.0 g of SMA 40. As seen in Table V, Example 4 illustrates lower $D_k/D_f$ values than Example 2. The lower $D_k/D_f$ values of Example 4 can be attributed to the CE-DOP-BN. For example, referring to Example 4 and Comparative Example D, both have the same amount of the SMA 40, but Example 4 incorporates CE-DOP-BN whereas Comparative Example D incorporates DOP-BN. As seen in Table V, Example 4 has lower $D_k/D_f$ values and higher $T_g$ than Comparative Example D. Therefore, the low $D_k/D_f$ values of Example 4 can be attributed to the incorporation of the CE-DOP-BN. Thus, the CE-DOP-BN can provide improved characteristics over the DOP-BN.

Examples 5-11 and Comparative Examples E-F

To determine a proper molar ratio of the epoxy to the styrene and maleic anhydride copolymer, the molar ratio was varied in Examples 5-11. For Examples 5-11, the phosphorus content and the amount of CE-DOP-BN weight ratio were fixed, while the molar ratio of the epoxy (i.e., the epoxy group) to the styrene and maleic anhydride copolymer was varied. Comparative Examples E-G illustrate curable compositions not including a non-halogen flame retardant agent.

Examples 5-11

A portion of CE-DOP-BN, an epoxy resin, a styrene and maleic anhydride copolymer, and a solvent were mixed together according to the formulations in Table VI and shaken to form a uniform solution.

Comparative Examples E-G

A portion of DOP-BN, an epoxy resin, a styrene and maleic anhydride copolymer, and a solvent were mixed together according to the formulations in Table VII and shaken to form a uniform solution.

TABLE VI

Examples 5-11 Formulations

| | Units | Example 5 | Example 6 | Example 7 | Example 8 | Example 9 | Example 10 | Example 11 |
|---|---|---|---|---|---|---|---|---|
| Epoxy Resin (HP 7200) | g | 2.44 | 2.69 | 2.79 | 3.25 | 3.59 | 5.50 | 4.04 |
| CE-DOP-BN | g | 3.50 | 3.50 | 3.46 | 3.50 | 3.50 | 5.00 | 2.00 |
| SMA 40 | g | 4.45 | 4.16 | 4.00 | 3.63 | 3.28 | 4.30 | 5.80 |
| MEK | g | 3.43 | 3.4 | 3.37 | 3.42 | 3.41 | 4.87 | 5.89 |
| DMF | g | 3.50 | 3.50 | 3.46 | 3.50 | 3.50 | 5.00 | 2.00 |
| P Content | % | 2.7 | 2.7 | 2.7 | 2.7 | 2.7 | 2.7 | 1.4 |
| Molar Ratio (HP7200:SMA 40) | — | 1.0:1.0 | 1.3:1.0 | 1.4:1.0 | 1.8:1.0 | 2.2:1.0 | 2.6:1.0 | 1.4:1.0 |

TABLE VI-continued

Examples 5-11 Formulations

|  | Units | Example 5 | Example 6 | Example 7 | Example 8 | Example 9 | Example 10 | Example 11 |
|---|---|---|---|---|---|---|---|---|
| CE-DOP-BN | wt. % | 33.7 | 33.7 | 33.7 | 33.7 | 33.7 | 33.7 | 17.0 |
| SMA 40 | wt. % | 43.0 | 40.0 | 39.0 | 35.0 | 32.0 | 29.0 | 49.0 |
| Zn catalyst | mg | 20 | 18 | 20 | 20 | 20 | 150 | 28 |
| 2MI | mg | 35 | 133 | 35 | 34 | 44 | 150 | 100 |
| Gel time | s | 500 | 510 | 460 | 420 | 540 | 390 | 480 |

TABLE VII

Comparative Examples E-G Formulations

|  | Units | Comparative Example E | Comparative Example F | Comparative Example G |
|---|---|---|---|---|
| Epoxy Resin (HP 7200) | g | 4.38 | 5.18 | 6.28 |
| SMA 40 | g | 8.0 | 8.0 | 8.0 |
| MEK | g | 8.25 | 8.79 | 9.52 |
| DMF | g | — | — | — |
| Molar Ratio (HP7200:SMA40) | — | 1.1:1.0 | 1.3:1.0 | 1.4:1:0 |
| SMA 40 | wt. % | 65 | 61 | 59 |
| 2MI | mg | 40 | 30 | 35 |
| Gel time | s | 240 | 260 | 255 |

Analysis of Examples 5-11 and Comparative Examples E-G

The curing catalysts, according to the formulations in Table VI and Table VII, were added to the curable compositions of Examples 5-11 and Comparative Examples E-G, and a gel time of the curable composition was tested on a hot plate maintained at 171° C.

Glass Transition Temperature: The gelled curable composition was recovered from the hot plate surface and post-cured in an oven at 200° C. for 3 hours to form a cured product. The glass transition temperature ($T_g$) of the cured product was measured by Differential Scanning Calorimetry (DSC). The results are illustrated in Table VIII.

Prepregs: The curable compositions of Examples 5-11 and Comparative Examples E-G were brushed on a glass fiber sheet (E-glass, Hexcel 7628) and the glass fiber sheet was put in a 177° C. oven with air flow for 180 seconds to obtain prepregs of Examples 5-11 and Comparative Examples E-G. The prepregs were crushed to collect prepreg powder of Examples 5-11 and Comparative Examples E-G.

Plaque Testing: Prepreg powders about 3 g of Examples 5-11 and Comparative Examples E-G were put on a flat aluminum foil, and then the aluminum foil with the prepreg powder was placed on a flat metal plate. The assembly was heated to 200° C. until the prepreg powder melted. The melted prepreg powder was covered with another aluminum foil and then a flat metal plate was placed on the aluminum foil. The assembly was hot pressed at 200° C. for 1 hour and then was post cured at 200° C. for another 3 hours. An air bubble free plaque with a thickness of 0.3~0.5 millimeters was obtained and the dielectric constant/dissipation factor ($D_k/D_f$) and the glass transition temperature ($T_g$) were determined. The glass transition temperature was determined using Dynamic Mechanic Thermal Analysis (DMTA). The results are illustrated in Table VIII.

TABLE VIII

Results

|  | $T_g$ by DSC (° C.) | $T_g$ by DMA (° C.) | $D_k/D_f$ @ 1 GHz |
|---|---|---|---|
| Example 5 | 175 | 184 | 3.04/0.005~6 |
| Example 6 | 175 | 190 | 3.10/0.005~6 |
| Example 7 | 181 | 190 | 3.00/0.005~6 |
| Example 8 | 184 | 193 | 3.10/0.007~8 |
| Example 9 | 189 | 192 | 3.10/0.008~9 |
| Example 10 | 185 | 192 | 3.10/0.010 |
| Example 11 | 183 | 194 | 3.14/0.008~9 |
| Comparative Example E | 196 | 197 | 2.96/0.008 |
| Comparative Example F | 175 | 186 | 3.00/0.011 |
| Comparative Example G | 162 | 174 | 3.10/0.012 |

As seen in Table VIII, the $D_f$ values for Examples 5-9 and 11 are illustrated as "0.005~6", as seen for Example 5. The $D_f$ testing was done several times and for some Examples (i.e., Examples 5-9 and 11) the $D_f$ value varied, thus is presented as "0.005~6" meaning the $D_f$ values ranged from 0.005 to 0.006. For the dielectric constant ($D_k$) tests, 0.1 variation may come from the testing and is considered acceptable. For the dissipation factor ($D_f$) tests, smaller than 0.001 variation may come from the testing and is considered acceptable.

As the molar ratio of HP7200 (epoxy resin) with SMA 40 went from 1.1:1.0 (Example 5) to 2.6:1.0 (Example 11), the $D_k$ of the cured resin did not have a significant change (e.g., a change of approximately 0.1, which is considered acceptable variation). However, the $D_f$ increased as the molar ratio increased from Example 5 to Example 11 (e.g., a change of 0.005, which is greater than the acceptable variance). When the molar ratio of HP7200 with SMA 40 was 1.3:1.0 (Example 6) or above, the $T_g$ of the cured resin almost had no change. Therefore, comparing the results illustrates that Examples 6 and 7 provide the best $T_g$ and $D_k/D_f$ values.

Comparative Examples E-G do not include the CE-DOP-BN. Comparing Examples 5-7 with Comparative Examples E-G having the same molar ratio of HP7200 to SMA 40 (i.e., Example 5 vs. Comparative Example E; Example 6 vs. Comparative Example F; Example 7 vs. Comparative Example G), Examples 5-7 provide lower Df values than their corresponding Comparative Examples E-G, respectively, even though SMA40 content in Examples 5-7 are lower than the SMA 40 content in the corresponding Comparative Examples F-G. Moreover, Example 7 showed a higher $T_g$ than comparative Example G.

Additionally, comparing Example 7 with Example 11 illustrates that even though Example 7 and 11 have the same molar ratio of HP7200 to SMA EF40, Example 7 provides lower $D_k/D_f$ values with a higher amount of CE-DOP-BN in the formulation. Thus, it can be determined that the CE-DOP-BN is beneficial to the dielectric properties ($D_k/D_f$).

The invention claimed is:

1. A curable composition, comprising:
   an epoxy resin;
   a non-halogen flame retardant agent comprising at least two of an aryl-cyanato group and at least two of a phosphorus group; and
   a styrene and maleic anhydride copolymer;
   where the non-halogen flame retardant agent is represented by a compound of Formula (I):

Formula (I)

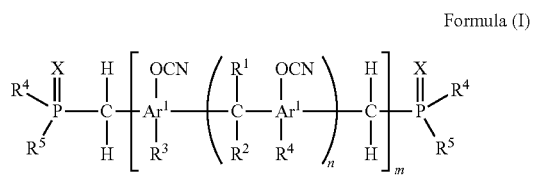

wherein m is an integer from 1 to 20;
   wherein n is an integer from 0 to 20 with the proviso that when n is 0 then m is an integer from 2 to 20;
   wherein each X is selected from the group consisting of sulfur, oxygen, a lone electron pair, and combinations thereof;
   wherein each $R^1$ and $R^2$ is independently a hydrogen, an aliphatic moiety having 1 to 20 carbon atoms, or aromatic hydrocarbon moiety having 6 to 20 carbon atoms, where the aliphatic moiety and the aromatic hydrocarbon moiety can be joined to form a cyclic structure;
   wherein $R^3$ is selected from the group consisting of a hydrogen, an aliphatic moiety having 1 to 20 carbon atoms, an aromatic hydrocarbon moiety having 6 to 20 carbon atoms, $R^4R^5P(=X)CH_2$—, and $ROCH_2$—, where R is an aliphatic moiety having 1 to 20 carbon atoms; and
   wherein each $R^4$ and $R^5$ is independently an aliphatic moiety having 1 to 20 carbon atoms, an aromatic hydrocarbon moiety having 6 to 20 carbon atoms, where the aliphatic moiety and the aromatic hydrocarbon moiety can be joined to form a cyclic structure, RX—, or wherein $R^4$ and $R^5$ together are —$Ar^2X$—; and
   wherein each $Ar^1$ and $Ar^2$ is independently a benzene, a naphthalene, or a biphenyl.

2. The curable composition of claim 1, wherein for the compound of Formula (I) X is oxygen, n is 1, m is 1, each $R^1$ and $R^2$ is a methyl group, $R^3$ is $R^4R^5P(=X)CH_2$—, and $R^4$ and $R^5$ together are —$Ar^2X$—, wherein $Ar^2$ is biphenyl such that $R^4R^5P(=X)$— is represented by a compound of Formula (II):

Formula (II)

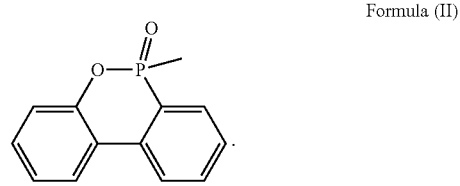 [SMILES: CP1(=O)Oc2ccccc2-c2ccccc21]

3. The curable composition of claim 1, wherein for the compound of Formula (I) X is oxygen, n is 0, m is 2 or 3, $R^3$ is $R^4R^5P(=X)CH_2$—, and $R^4$ and $R^5$ together are —$Ar^2X$—, wherein $Ar^2$ is biphenyl such that $R^4R^5P(=X)$— is represented by a compound of Formula (II):

Formula (II)

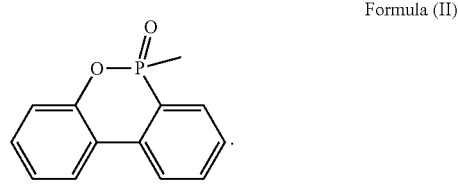 [SMILES: CP1(=O)Oc2ccccc2-c2ccccc21]

4. The curable composition of claim 1, where $Ar^1$ is benzene.

5. The curable composition of claim 1, where an epoxy group of the epoxy resin to a maleic anhydride group of the styrene and maleic anhydride copolymer has a molar ratio within a range of from 1.0:1.0 to 2.6:1.0.

6. The curable composition of claim 1, where an epoxy group of the epoxy resin to a maleic anhydride group of the styrene and maleic anhydride copolymer has a molar ratio within a range of from 1.3:1.0 to 1.8:1.0.

7. The curable composition of claim 1, where an epoxy group of the epoxy resin to a maleic anhydride group of the styrene and maleic anhydride copolymer has a molar ratio within a range of from 1.3:1.0 to 1.4:1.0.

8. The curable composition of claim 1, where the curable composition has a phosphorus content within a range of from 0.1 weight percent to 3.5 weight percent based on a total weight of the curable composition.

9. The curable composition of claim 1, where the curable composition has a phosphorus content within a range of from 2.2 weight percent to 3.0 weight percent based on the total weight of the curable composition.

10. The curable composition of claim 1, where the styrene and maleic anhydride copolymer has a molar ratio of styrene to maleic anhydride within a range of from 1:1 to 8:1.

11. The curable composition of claim 10, where the non-halogen flame retardant agent is 10 weight percent to 60 weight percent of the total weight of the curable composition.

12. The curable composition of claim 11, where the styrene and maleic anhydride copolymer is 20 weight percent to 60 weight percent of the total weight of the curable composition.

13. The curable composition of claim 1, where the non-halogen flame retardant agent is 1 weight percent to 90 weight percent of a total weight of the curable composition.

14. The curable composition of claim 1, where the styrene and maleic anhydride copolymer is 10 weight percent to 90 weight percent of a total weight of the curable composition.

15. A prepreg that includes a reinforcement component and the curable composition of claim 1.

16. A method of preparing a curable composition, comprising:
   providing an epoxy resin; and
   reacting the epoxy resin with a non-halogen flame retardant agent and a copolymer of styrene with maleic anhydride, wherein the non-halogen flame retardant agent comprises at least two of an aryl-cyanato group and at least two of a phosphorus group and the non-halogen flame retardant agent is formed by condensing an etherified resole with (H—P(=X)$R^4R^5$) to form a reaction product, wherein each $R^4$ and $R^5$ is independently an aliphatic moiety having 1 to 20 carbon atoms, an aromatic hydrocarbon moiety having 6 to 20 carbon atoms, where the aliphatic moiety and the aromatic hydrocarbon moiety can be joined to form a cyclic structure, RX—, or wherein $R^4$ and $R^5$ together are —$Ar^2X$—; wherein X is sulfur, oxygen, or a lone electron pair; and wherein $Ar^2$ is benzene, naphthalene, or biphenyl and R is an aliphatic moiety having 1 to 20 carbon atoms; and converting the reaction product to the non-halogen flame retardant agent with a cyanogen halide and a base.

17. The method of claim 16, wherein $R^4$ and $R^5$ together are —$Ar^2X$—, X is oxygen and $Ar^2$ is biphenyl to give 9,10-dihydro-9-oxa-10-phosphaphenanthrene-10-oxide.

* * * * *